United States Patent

[11] 3,595,548

| [72] | Inventor | Claude Tsymbal |
| | | Metz, France |
| [21] | Appl. No | 852,514 |
| [22] | Filed | Aug. 22, 1969 |
| [45] | Patented | July 27, 1971 |
| [73] | Assignee | Institut De Recherches De La Siderurgie Francaise |
| | | Germain en Laye, France |
| [32] | Priority | Aug. 23, 1968 |
| [33] | | France |
| [31] | | 164,094 |

[54] METALLURGICAL REFINING VESSEL
10 Claims, 1 Drawing Fig.

[52] U.S. Cl. .................................................. 266/35,
266/43
[51] Int. Cl. ...................................... C21c 5/42
[50] Field of Search............................ 266/34,
DIG. 6, 35, 36 P, 36 H, 43, 38, 39, 40

[56] References Cited
UNITED STATES PATENTS

| 3,193,272 | 7/1965 | Kramer et al. | 266/36 P |
| 3,345,058 | 10/1967 | Pere | 266/36 P |

FOREIGN PATENTS

| 9,498 | 6/1884 | Great Britain | 266/35 |
| 959,940 | 2/1963 | Great Britain | 266/36 P |

*Primary Examiner*—Gerald A. Dost
*Attorney*—Michael S. Striker

ABSTRACT: A refining vessel for top blowing of pig iron comprises a main lining consisting of a refractory material and having a thermal conductivity of 2—6 k.cal./h.m.° C. The upper part of the main lining is surrounded by one or more envelopes of thermally insulating material having a thermal conductivity of less than 2 k.cal./h.m.° C. and the lower part of the main lining (namely, that part which surrounds the molten metal bath) is surrounded by a jacket for circulating water, air or other fluid coolant. The envelope prevents excessive cooling of the normally cooler upper part and the jacket prevents overheating of the normally hotter lower part of the vessel.

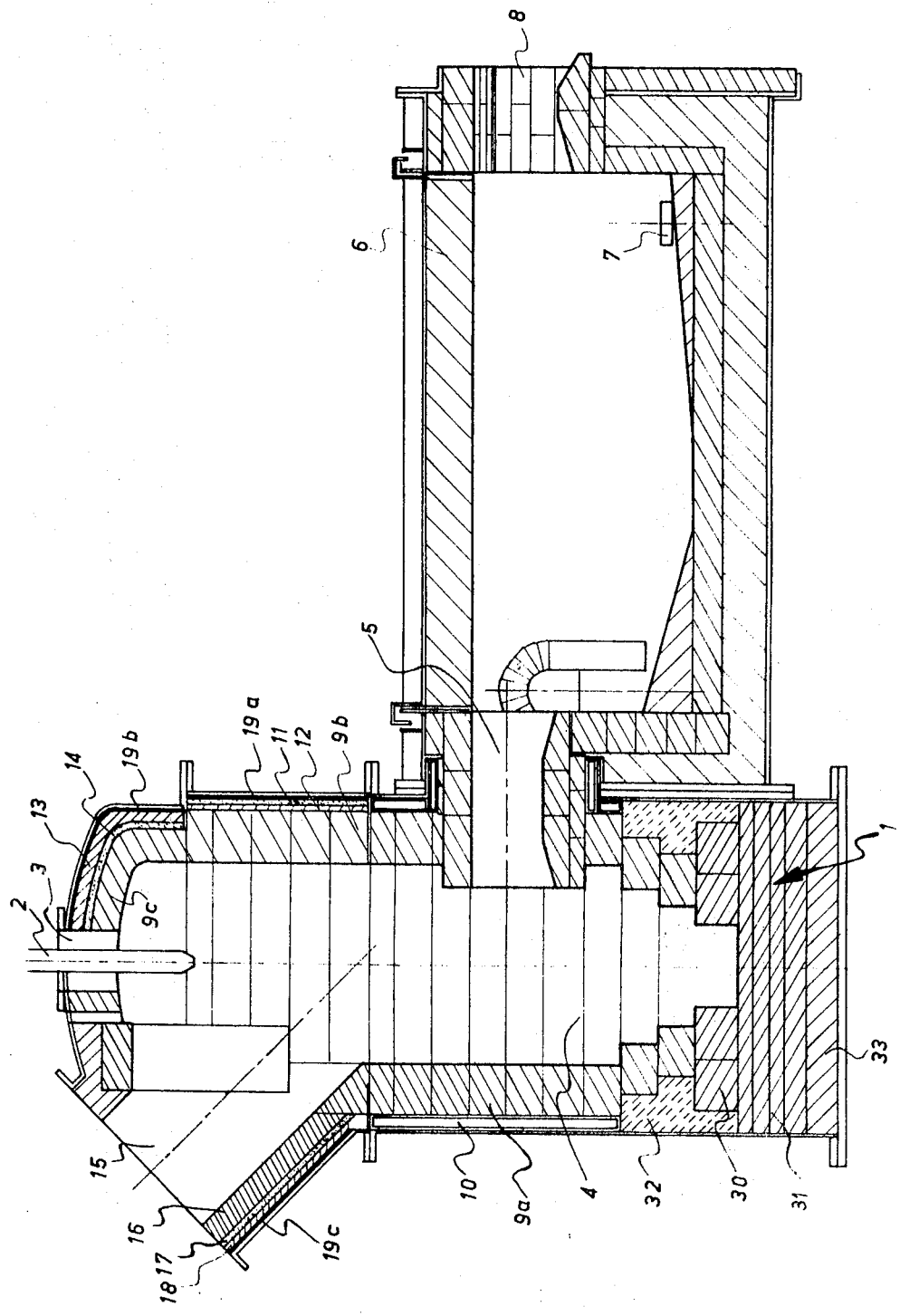

METALLURGICAL REFINING VESSEL

BACKGROUND OF THE INVENTION

The present invention relates to metallurgical apparatus in general, and more particularly to improvements in vessels which can be utilized for refining of molten metals or the like. Still more particularly, the invention relates to improvements in vessels which are especially suited for treatment of molten metals by means of oxygen and/or other gaseous substances which are admitted by way of lances or the like.

It is well known that the lining which surrounds the interior of a metallurgical vessel undergoes rapid wear, mainly because of high temperatures which develop while the metal reacts with gases. This contributes significantly to the cost of the refined metal (such as steel) not only because the refractory material of which the lining consists is expensive but also because frequent repairs or replacements of the lining necessitate extended interruptions in operation of the vessel. The problem is especially acute in vessels wherein the oxygen is admitted above the molten metal at a rate which suffices to develop a foam consisting of gases, molten metal and slag. The foam subjects the lining to thermal stresses and reacts with the material of the lining so that the lining acquires an irregular profile. The wear is especially pronounced in the median and lower sections of the vessel which accommodate the foam. It is therefore necessary to replace or repair the lining in the median and lower sections at frequent intervals whereas the lining is still satisfactory in the remaining sections, especially in the upper section of the vessel.

The upper section is subjected to lower temperatures which brings about other undesirable effects, especially the deposition of solidified slag which is likely to clog the lance and/or the gas evacuating duct or ducts of the vessel.

SUMMARY OF THE INVENTION

An object of the invention is to provide a novel and improved metallurgical vessel whose useful life exceeds the useful life of conventional vessels.

Another object of the invention is to provide a novel and improved lining for a vessel of the above outlined character.

A further object of the invention is to provide a vessel which is less likely to accumulate solidified slag than conventional vessels and wherein excessive heating and/or excessive cooling of certain sections is prevented in a simple and relatively inexpensive way.

An additional object of the invention is to provide a method of equalizing the temperatures in the interior of a metallurgical vessel, especially in the interior of a vessel for top blowing of pig iron.

The invention is embodied in a metallurgical vessel, particularly in a refining vessel for top blowing of molten metals, which comprises a first or lower section and a second section located above the first section. The two sections include a main lining consisting of refractory material having an average thermal conductivity of 2—6 k.cal./h.m.° C. and surrounding an internal space the lower zone of which accommodates a bath of molten metal. At least the second section further includes at least one envelope surrounding the corresponding responding part of the main lining and consisting of a thermally insulating material whose average thermal conductivity at most equals 2 k.cal./h.m.° c., and the first section further includes a cooling belt surrounding the corresponding part of the main lining and preferably including a coolant circulating jacket. The belt cools the first section and the envelope prevents excessive cooling of the second section so that the main lining is subjected to lesser thermal stresses and the main lining in the second section is less likely to accumulate solidified slag.

The novel features which are considered as characteristic of the invention are set forth in particular in the appended claims. The improved vessel itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a central vertical sectional view of a metallurgical apparatus including a refining vessel which embodies the invention.

DESCRIPTION OF THE PREFERRED EMBODIMENT

Referring to the drawing in detail, there is shown a metallurgical apparatus which includes basically a refining vessel 1 and a decantation vessel 6. The upper section of the refining vessel 1 is provided with an opening 3 for introduction of a lance 2 which which admits oxygen for top blowing of molten pig iron in the lower section of the vessel 1. Such top blowing normally takes place in the presence of certain additional agents in a manner not forming part of the present invention. The vessel 1 is of generally cylindrical shape and the lower portion of its internal chamber receives molten iron by way of an inlet which is not shown in the drawing. The lance 2 admits oxygen at such a rate that the molten metal is broken up into fine particles or globules which fill the median zone 4 of the chamber and form a foam which further includes molten slag and bubbles of gas. The foam continuously overflows through an outlet or nozzle 5 and enters the interior of the decantation vessel 6. The latter comprises a lower outlet 7 for refined metal and an upper outlet 8 for slag. The manner in which the metal is treated in the vessels 1 and 6 is disclosed in the copending application Ser. No. 698,046 filed Jan. 15, 1968 by Vayssiere et al. and assigned to the same assignee.

The refining vessel 1 comprises a main lining 9a, 9b, 9c (also called wearing lining) which is assembled of bricks consisting of a refractory material, preferably a material composed mainly of magnesia which is fired and baked and is impregnated with tar. Such material preferably contains about 96 percent of MgO. The thickness of the lower portions 9a, 9b of the main lining is preferably about 250 millimeters, and its average thermal conductivity at a temperature between 16,000 and 1,100° C. is between 2—6 and preferably about 3 k.cal./h.m.° C.

$$\frac{\text{kilocalories}}{(\text{meters} \times \text{hours} \times °C.)}$$

The lower part 9a of the lower section 9a, 9b of the main lining is surrounded by a cooling belt 10 which is intended to withdraw heat generated in the reaction zone 4 and transmitted by conduction through the wall of the portion 9a. The just mentioned belt comprises a box or jacket 10 which surrounds the entire median portion of the reaction vessel and is interrupted only where the nozzle 5 connects the vessel 1 with the vessel 6. The coolant is preferably water which is circulated by a suitable system of pumps or the like, not shown. The cooling action of the jacket 10 depends on the dimensions of the vessel 1, i.e., on the quantity of heat which should be withdrawn from the adjoining portion of the main lining around the reaction zone 4. The cooling action around this reaction zone contributes substantially to longer useful life of the refining vessel.

The portion 9b of the main lining extends between the lower portion 9a and the portion 9c which constitutes an arched roof. The portion 9b is surrounded by a relatively thin envelope 11 of thermally insulating material. Such material is preferably a high alumina content refractory material containing about 60 percent of $Al_2O_3$ and having a relatively low thermal conductivity ($\lambda$=0.40 at 900° C.). The thickness of the envelope 11 is about 30 millimeters.

The composition of the portion 9b of the main lining is preferably identical with that of the portion 9a. A thin layer or intermediate envelope 12 is tamped between the portion 9b and envelope 11; the thickness of this layer is preferably about 30 millimeters and its material is preferably a pise containing mainly magnesia and bonded with tar. The thermal conductivity of the layer 12 is preferably the same as that of the portions 9a, 9b. The average temperature to which the layer 12 is subjected is about 1,100° C. and the average temperature of the portion 9b of the main lining is about 1,650° C.

The arched roof 9c of the main lining consists of refractory material and has a thickness of about 150 millimeters. It is preferably a magnesia pise without tar and is joined to the portion 9b of the main lining. The thermal conductivity of the roof 9c is between 2 and 6, preferably between 3 and 4 k.cal./h.m.° C. The roof 9c is surrounded by an envelope 13 which constitutes a secondary thermal insulator and consists of heat insulating refractory material including silica and containing about 35 percent of alumina. Its thermal conductivity is less than 2 and preferably 0.2—0.25 k.cal./h.m.° C. at about 500° C. which is the average temperature in this section of the vessel 1. The thickness of the envelope 13 is about 60 millimeters; such thickness may approximate the thickness of the roof 9c in the coolest region of the roof, i.e., immediately adjacent to the opening 3.

A further layer or intermediate envelope 14 is provided to prevent chemical reactions between the material of the roof 9c and that of the envelope 13. The material of the layer 14 is preferably the same as that of the envelope 11, i.e., a material containing a high percentage of alumina which is amphoteric. The thickness of the layer 14 is about 30 millimeters and its thermal conductivity is low, e.g., about 0.5 k.cal./h.m.° C.; this layer can be said to constitute a thermal insulator with the resulting advantage of reducing the temperature of the outer envelope 13.

The numeral 15 denotes a gas evacuating duct. In order to prevent deposition of solidified slag which tends to develop as a result of cooling of metallic projections as along the interior of the main lining portions 9a, 9b, the duct 15 is preferably provided with thermal insulation which may be the same as that employed in the top section of the vessel 1. As shown, the duct 15 includes a main tube 16 whose material is similar to or identical with that of the main lining portion 9a which has a thickness of about 125 millimeters, an intermediate tube 17 whose material is preferably identical to that of the envelope 11 or 14 and has a thickness of 30 millimeters, and an outer tube 18 which consists of the same material as the envelope 13.

The entire upper section of the vessel 1 is further surrounded by an outer layer or liner of asbestos including the portions 19a, 19b, 19c and having a thickness of about 10 millimeters.

The bottom section of the vessel 1 is assembled of baked refractory bricks 30 containing 96 percent of MgO and impregnated with tar. These bricks rest on a base 31 consisting of the same material. The space between the metallic shell of the vessel 1 and the bricks 30 contains a tamped pise of refractory material 32 containing mainly MgO and bonded with tar. The vessel 1 rests on a floor 33 of a MgO pise without tar.

The rate at which the jacket 10 circulates air, water or another coolant depends on the desired cooling effect of the belt. The optimum location of this belt can be determined by simple experimentation.

An important advantage of the vessel 1 is that the section which surrounds the main source of heat is cooled and that the upper section is provided with highly effective thermal insulation. This is in contrast with conventional vessels wherein the upper sections tend to become cooler. As a result of cooling in the middle and effective thermal insulation at the top, the temperatures along the internal surface of the vessel 1 and its duct 15 are much more uniform than in conventional vessels. Such construction also contributes to lower maintenance cost and to greater efficiency of the vessel. The wear on the portion 9a of the main lining is surprisingly low because it is cooled from without by the jacket 10; this prolongs the useful life of the main lining and insures a higher output because the main lining must be replaced at less frequent intervals. the improved thermal insulation 11—14 in the upper part of the vessel 1 prevents the deposition of solidified slag which also results in substantial reduction of maintenance costs, i.e., because the roof 9c must be cleaned at less frequent intervals. The same holds true for the inner tube 16 of the duct 15.

The vessel 1 comprises a basic lining because the molten metal to be treated therein is assumed to contain phosphorus. It is clear, however, that the main lining can be acid if the nature of molten metal in the vessel renders it necessary or desirable.

Without further analysis, the foregoing will so fully reveal the gist of the present invention that others can, by applying current knowledge, readily adapt if for various applications without omitting features which fairly constitute essential characteristics of the generic and specific aspects of my contribution to the art.

What I claim as new and desired to be protected by Letters Patent is set forth in the appended

1. A metallurgical vessel, particularly a refining vessel for top blowing of molten metals, comprising a first section and a second section located above said first section, said sections defining a metal-receiving chamber and including a main lining consisting of a refractory material having an average thermal conductivity of 2—6 k.cal./h.m.° C., said second section further including at least one envelope surrounding the corresponding part of said main lining and consisting of a thermally insulating material whose average thermal conductivity at most equals 2 k.cal./h.m.° C., and said first section further comprising a cooling belt surrounding the corresponding part of said main lining.

2. A vessel as defined in claim 1, wherein said second section is provided with a plurality of openings.

3. A vessel as defined in claim 1, wherein at least said second section further comprises a layer located between said main lining and said envelope and consisting of a refractory material.

4. A vessel as defined in claim 3, wherein the thermal conductivity of said layer at most equals 2 k.cal./h.m.° C.

5. A vessel as defined in claim 1, wherein said second section is provided with a duct including an inner tube forming part of said main lining and an outer tube forming part of said envelope.

6. A vessel as defined in claim 1, further comprising an external liner of asbestos surrounding said envelope, 7. A vessel as defined in claim 1, wherein the wall thickness of said main lining in the first section exceeds the wall thickness in said second section.

8. A vessel as defined in claim 1, wherein said cooling belt comprises a coolant-circulating jacket.

9. A vessel as defined in claim 1, wherein the main lining in said second section forms an arched roof provided with an opening and further comprising gas admitting tubular means extending through said opening and into the interior of said vessel.

10. A vessel as defined in claim 1, further comprising a refractory base and a refractory brickwork mounted on said base and supporting said first section.